(12) United States Patent
Young

(10) Patent No.: US 12,142,167 B2
(45) Date of Patent: Nov. 12, 2024

(54) TAMPER EVIDENT LABEL

(71) Applicant: Multi-Color Corporation, Batavia, OH (US)

(72) Inventor: Patrick A. Young, Appleton, WI (US)

(73) Assignee: Multi-Color Corporation, Batavia, OH (US)

( * ) Notice: Subject to any disclaimer, the term of this patent is extended or adjusted under 35 U.S.C. 154(b) by 139 days.

(21) Appl. No.: 18/154,081

(22) Filed: Jan. 13, 2023

(65) Prior Publication Data

US 2023/0230509 A1 Jul. 20, 2023

Related U.S. Application Data

(60) Provisional application No. 63/266,848, filed on Jan. 17, 2022.

(51) Int. Cl.
*G09F 3/02* (2006.01)
*B31D 1/02* (2006.01)
(Continued)

(52) U.S. Cl.
CPC ........... *G09F 3/0292* (2013.01); *B31D 1/028* (2013.01); *B32B 3/266* (2013.01); *B32B 7/12* (2013.01); *B32B 29/005* (2013.01); *B32B 37/24* (2013.01); *B65D 55/024* (2013.01); *G09F 3/10* (2013.01); *B32B 2037/243* (2013.01); *B32B 2405/00* (2013.01); *B32B 2519/02* (2013.01); *G09F 2003/023* (2013.01); *G09F 2003/0257* (2013.01); *G09F 2003/0269* (2013.01); *G09F 2003/0272* (2013.01)

(58) Field of Classification Search
CPC .... G09F 3/0292; G09F 3/10; G09F 2003/023; G09F 2003/0257; G09F 2003/0269; G09F 2003/0272; G09F 2003/0222; G09F 2003/0277; G09F 3/0297; G09F 3/0341; B31D 1/028; B32B 3/266; B32B 7/12; B32B 29/005; B32B 37/24; B32B 2037/243; B32B 2405/00; B32B 2519/02; B32B 2250/26; B32B 2255/12; B32B 3/08; B32B 2255/28; B65D 55/024
USPC .......... 428/916, 195.1, 201, 202, 40.1, 41.5, 428/41.9, 42.2, 42.3
See application file for complete search history.

(56) References Cited

U.S. PATENT DOCUMENTS

| 5,944,355 A | * | 8/1999 | Rich | ..................... G09F 3/0288 283/105 |
|---|---|---|---|---|
| 8,368,539 B2 | | 2/2013 | Adstedt et al. | |

(Continued)

*Primary Examiner* — Cassandra Davis
(74) *Attorney, Agent, or Firm* — Wood, Herron & Evans, LLP

(57) ABSTRACT

A tamper evident label is provided. The tamper evident label broadly includes a base ply of pressure-sensitive material and a top ply of pressure-sensitive material. The base ply and the top ply are laminated together to form the tamper evident label The base ply includes a first portion and a second portion. The second portion of the base ply includes internal cuts and deadened adhesive. The top ply includes a tab portion defined by tab cuts. The tab portion of the top ply and the region between the internal cuts of the base ply are configured to be removed from the tamper evident label to create visual evidence of tampering. Further, a method of constructing a tamper evident label and a method of using a tamper evident label are provided.

20 Claims, 4 Drawing Sheets

(51) Int. Cl.
*B32B 3/26* (2006.01)
*B32B 7/12* (2006.01)
*B32B 29/00* (2006.01)
*B32B 37/24* (2006.01)
*B65D 55/02* (2006.01)
*G09F 3/00* (2006.01)
*G09F 3/10* (2006.01)

(56) References Cited

U.S. PATENT DOCUMENTS

| | | | |
|---|---|---|---|
| 9,676,532 B2* | 6/2017 | Woo | B32B 27/08 |
| 2016/0180747 A1* | 6/2016 | Pietarinen | G09F 3/0292 |
| | | | 426/87 |
| 2018/0365818 A1 | 12/2018 | Weiß et al. | |
| 2018/0366038 A1* | 12/2018 | Eisele | G09F 3/0341 |
| 2022/0277670 A1* | 9/2022 | Young | G09F 3/02 |

* cited by examiner

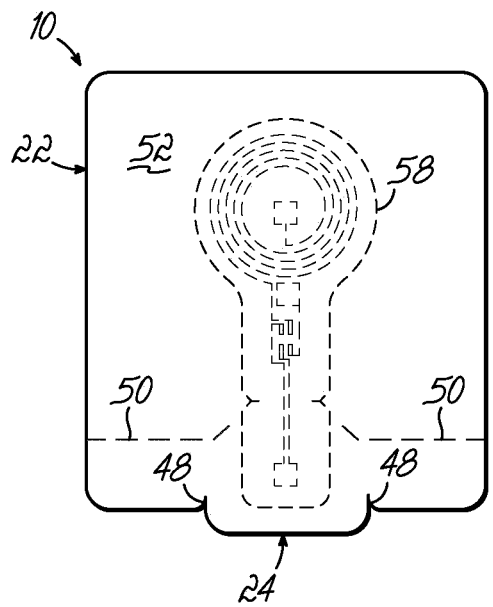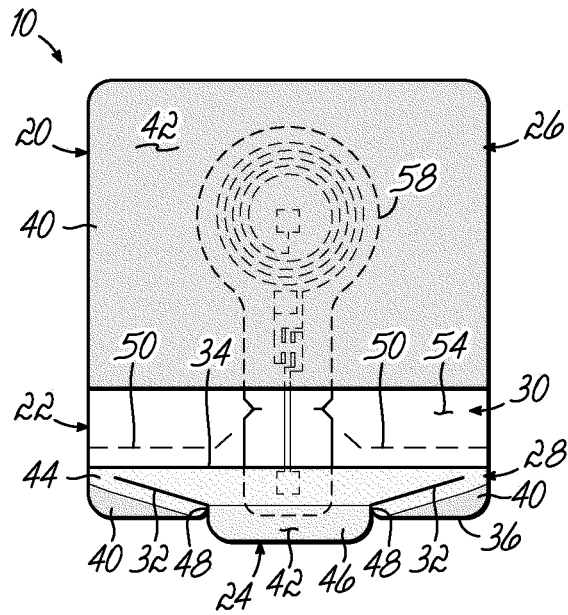
FIG. 6A  FIG. 6B
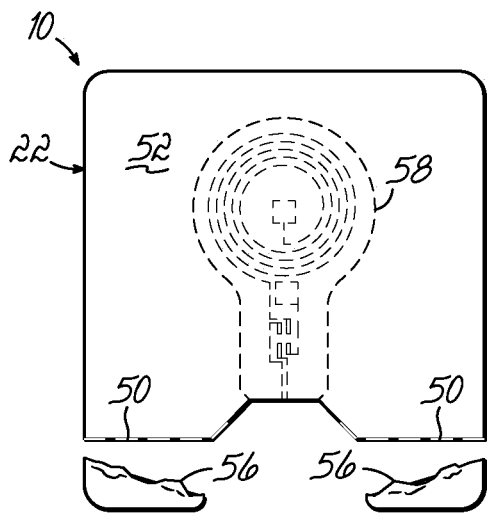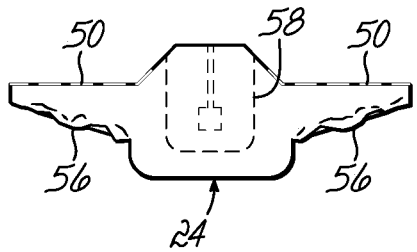
FIG. 7

TAMPER EVIDENT LABEL

CROSS-REFERENCE TO RELATED APPLICATION

This application claims the benefit of the filing date of U.S. Patent Application Ser. No. 63/266,848, filed on Jan. 17, 2022, the disclosure of which is incorporated by reference herein in its entirety.

TECHNICAL FIELD

This application relates generally to labels and packaging, and particularly to security labels.

BACKGROUND

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Various forms of security labels are employed to ensure that a container or other article is not unknowingly tampered with (such as by being opened) prior to use by an end user. However, existing security labels exhibit various shortcomings and drawbacks. For example, the addition of a security label to a container can make the container too difficult or time consuming to open. Such can be detrimental in a medical or health care environment, for example, where ease of use and timeliness are critical to patient care. Additionally, for some security labels, it may be difficult to visually determine if the security label has been fractured or otherwise altered.

Accordingly, it would be desirable to provide a tamper evident label that avoids, alleviates, or otherwise minimizes shortcomings and drawbacks of existing security labels.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention.

In a first set of embodiments of the invention, a tamper evident label is provided. The tamper evident label includes a base ply of pressure-sensitive material and a top ply of pressure-sensitive material. The base ply includes a first portion and a separate second portion. The second portion of the base ply includes internal cuts extending from a first edge of the second portion towards a second edge of the second portion. The second portion of the base ply further includes a deadened adhesive located in a region substantially between the internal cuts. The top ply includes a tab portion. The tab portion is defined by tab cuts located on opposing sides of the tab portion. The tab cuts extend towards a center of the top ply. Further, the base ply and the top ply are laminated together to form the tamper evident label. Additionally, the tab portion of the top ply and the region substantially between the internal cuts of the base ply are configured to be removed from the tamper evident label to create visual evidence of tampering.

In one embodiment, the internal cuts of the base ply and the tab cuts of the top ply may be substantially aligned. Further, the internal cuts may extend towards a center of the second portion. Moreover, the top ply may include perforations extending substantially across a width of the top ply.

In another embodiment, the deadened adhesive may extend beyond the region substantially between the internal cuts. Further, the deadened adhesive may include partially deadened adhesive. The partially deadened adhesive may be located proximal to the first edge of the second portion of the base ply.

In yet another embodiment, the label may include an inlay element and removing the tab portion from the tamper evident label tab fractures the inlay element thereby disabling its use. Additionally, the inlay element may be selected from the group consisting of an RFID inlay and an NFC inlay.

In a further embodiment, the base ply and the top ply may be made of a material selected from the group consisting of paper and film.

In another set of embodiments of the invention, a method of constructing a tamper evident label is provided. The method includes providing a base ply of pressure-sensitive material. The base ply includes a first portion and a second portion. The second portion of the base ply includes internal cuts and an adhesive located in a region substantially between the internal cuts. The method also includes providing a top ply of pressure-sensitive material. The top ply includes a tab portion. The tab portion is defined by tab cuts located on opposing sides of the tab portion. The method also includes laminating the base ply and the top ply together to form the tamper evident label such that the internal cuts of the base ply and the tab cuts of the top ply are substantially aligned.

In one embodiment, the method may further include deadening the adhesive by applying a spot and/or pattern printed aqueous coating to the adhesive. Additionally, the step of deadening may include applying the spot and/or pattern printed aqueous coating by a print system selected from the group consisting of water-base, solvent-base, and UV coating.

In another embodiment, the adhesive may be printed on the second portion in a pattern. Further, the adhesive may be voided on the second portion in a pattern.

In yet another embodiment, the method may further include inserting an inlay element between the base ply and the top ply. Further, the inlay element may be selected from the group consisting of an RFID inlay and an NFC inlay.

In yet another set of embodiments of the invention, a method of using a tamper evident label is provided. The method includes providing the tamper evident label. The tamper evident label includes a base ply of pressure-sensitive material. The base ply includes a first portion and a second portion. The second portion includes internal cuts and a deadened adhesive located in a region substantially between the internal cuts. The base ply further includes a top ply of pressure-sensitive material. The top ply includes a tab portion. The tab portion is defined by tab cuts located on opposing sides of the tab portion. The base ply and the top ply are laminated together to form the tamper evident label. The method further includes applying the tamper evident label to an article over a boundary of the article.

In one embodiment, the method may further include removing the tab portion of the top ply and the region substantially between the plurality of internal cuts of the base ply from the tamper evident label to create visual evidence of tampering. Additionally, the tamper evident label may include an inlay element and the step of removing may further include fracturing the inlay element thereby disabling its use.

In another embodiment, the article may be a container. The container may include a lid and a sidewall. The boundary may be between the lid and the sidewall.

BRIEF DESCRIPTION OF THE DRAWINGS

The accompanying drawings, which are incorporated in and constitute a part of this specification, illustrate embodiments of the invention and, together with the detailed description given below, serve to explain the invention.

FIG. 6A is a front view of an alternative embodiment of a tamper evident label including an inlay element in accordance with principles of the present invention.

FIG. 6B is a rear view of the tamper evident label of FIG. 6A.

FIG. 7 is a front view of the tamper evident label of FIG. 6A, showing a tab removed from the tamper evident label.

DETAILED DESCRIPTION OF THE INVENTION

The exemplary embodiments described herein are provided for illustrative purposes and are not limiting. Other exemplary embodiments are possible, and modifications may be made to the exemplary embodiments within the scope of the present disclosure. Therefore, this Detailed Description is not meant to limit the scope of the present disclosure.

With reference to FIGS. 1 through 7, embodiments of a tamper evident label 10 (or portions thereof) in accordance with principles of the present invention are shown in detail. FIGS. 1 through 5 show one embodiment of a tamper evident label 10 or portions thereof in detail. FIGS. 6A through 7 show an alternative embodiment of a tamper evident label 10 or portions thereof in detail.

Advantageously, embodiments of the tamper evident label 10 offer an easily discernible visual indicator that an article 12 has or has not been tampered with (e.g., by being opened). In addition, embodiments of the tamper evident label 10 also avoid, alleviate, or otherwise minimize at least some of the drawbacks or shortcomings of existing security labels. For example, embodiments of the tamper evident label 10 described herein provide for greater hand or automatic application strength while requiring minimal force to grasp and open. Such may be important in medical and other healthcare applications where single gloved hand operation and opening is often necessary, for example. Other advantages and technical effects of embodiments of this invention will become evident to one skilled in the art from the following description.

Figure 1:
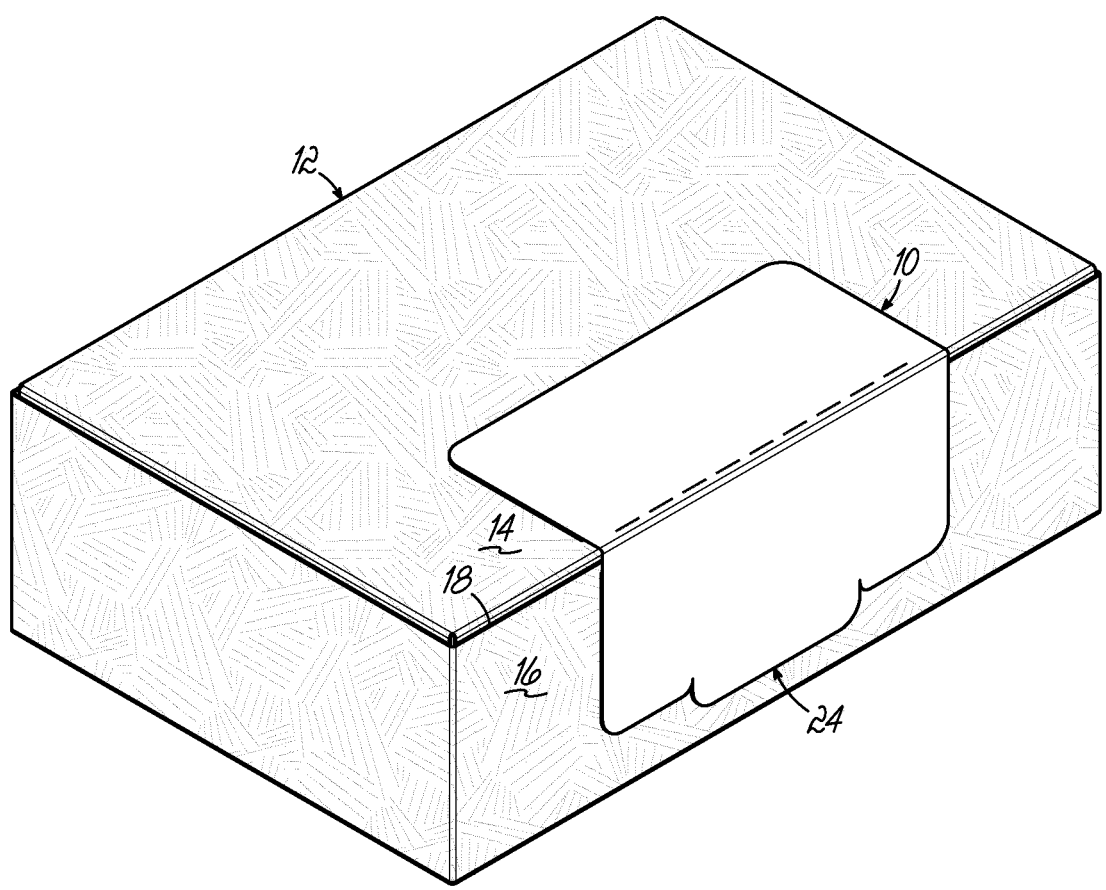
FIG. 1 is a perspective view of an embodiment of a tamper evident label affixed to an article in accordance with principles of the present invention.

Beginning with reference to FIG. 1, an embodiment of the tamper evident label 10 is shown as applied to an article 12. In the illustrated embodiment, the article 12 is a container, such as a box or carton. However, it is to be understood that the article 12 could take on other forms. Thus, while the article 12 may be described as a container at times herein, the tamper-evident label 10 is not limited to use on articles 12 that are containers. The article 12, as shown in the illustrated embodiment, includes a first part 14 adjacent to a second part 16. In the depicted embodiment, the first part 14 is shown as a lid of the container and the second part 16 is shown as a sidewall of the container. However, it is to be understood that the first and second parts 14, 16 can take on other forms (e.g., particularly so if the article 12 is not a container). The first part 14 and second part 16 are connected to each other at a boundary 18. In the depicted embodiment, the boundary 18 is an edge of the container between the lid and the sidewall. However, it Is to be understood that the boundary 18 may take on other forms. The tamper evident label 10 is applied to the article 12 over the boundary 18 between the first part 14 and second part 16 such that portions of the tamper evident label 10 are attached to both the first part 14 and the second part 16 of the article 12. In spanning the boundary 18, the tamper evident label 10 acts a visual indicator to a user that the article 12 has or has not been opened since the application of the tamper evident label 10.

Figure 2A:
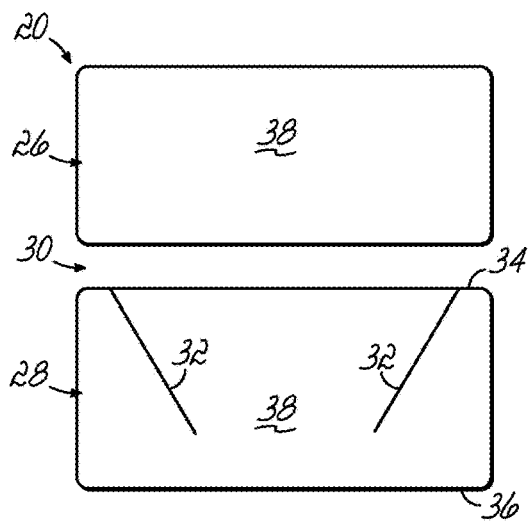
FIG. 2A is a front view of a base ply of the tamper evident label of FIG. 1.
Figure 2B:
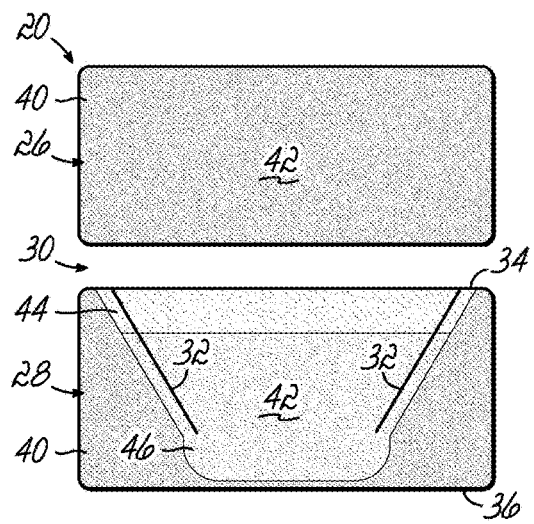
FIG. 2B is a rear view of the base ply of the tamper evident label of FIG. 1.
Figure 3A:
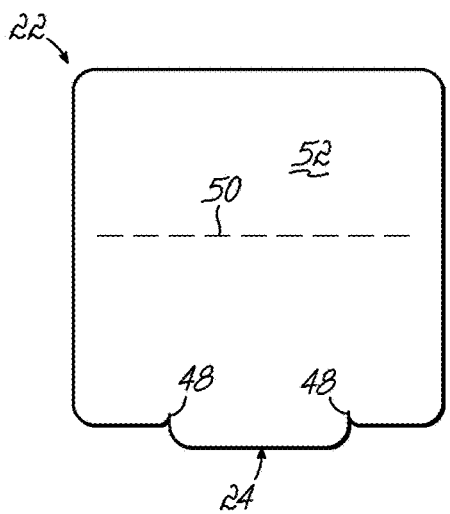
FIG. 3A is a front view of a top ply of the tamper evident label of FIG. 1.
Figure 3B:
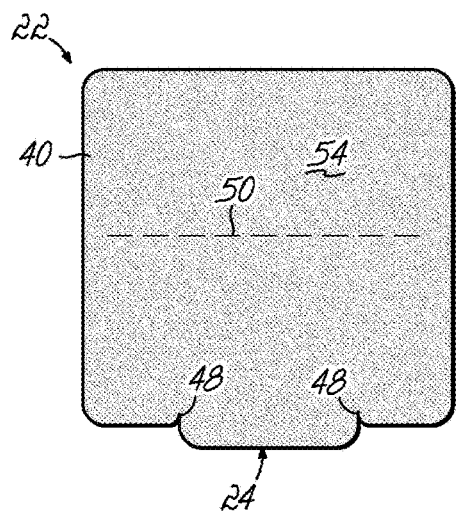
FIG. 3B is a rear view of the top ply of the tamper evident label of FIG. 1.
Figure 4A:
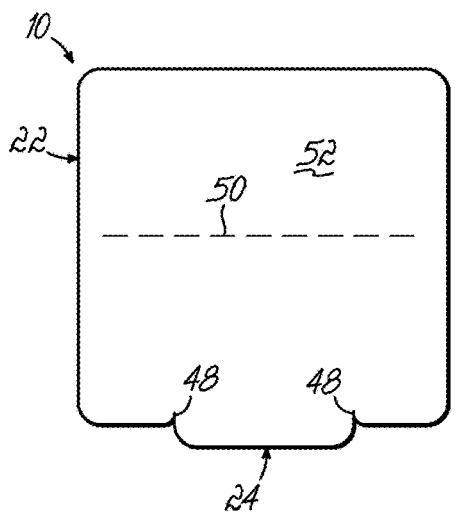
FIG. 4A is a front view of the tamper evident label of FIG. 1.
Figure 4B:
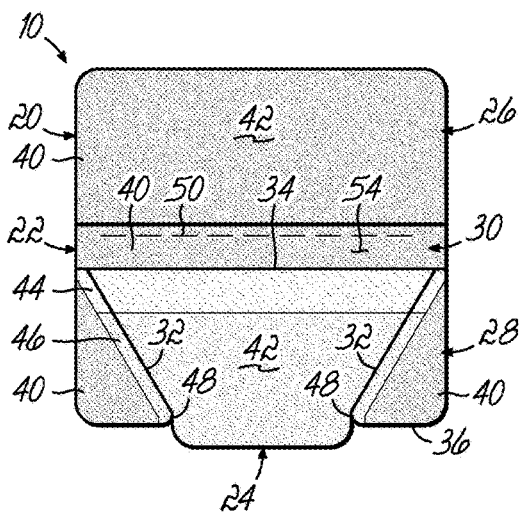
FIG. 4B is a rear view of the tamper evident label of FIG. 1.

In an embodiment, the tamper evident label 10 includes at least two plies—a base ply 20 (as shown in FIGS. 2A and 2B) and a top ply 22 (as shown in FIGS. 3A and 3B). The base ply 20 and the top ply 22 together form the tamper evident label 10 (as shown in FIGS. 4A and 4B). The base ply 20, the top ply 22, and the interactions therebetween are described in greater detail below with reference to FIGS. 2-5. At a high level, the parts of the tamper evident label 10 work together as follows. The base ply 20 is dimensioned to fit under and is configured to be attached to the top ply 22. Further, the tamper evident label 10 includes a tab 24. Pulling on the tab 24 (e.g., in order to access the contents of the article 12) removes a portion of both the top ply 22 and the base ply 20. After removal, the tab 24 cannot be reapplied to the article 12. At least because the tab 24 cannot be reapplied to the article 12 after peel or removal, the tamper evident label 10 offers easily discernible visual indication to a user that the article 12 has or has not been tampered with (e.g., opened if the article 12 is a container).

Referring now to FIGS. 2A and 2B, a base ply 20 of the label 10 is shown. The base ply 20 may be formed of paper, film, foil, or other suitable material. The base ply 20 is depicted as being generally rectangular in shape; however, it is to be understood that the base ply 20 may take on other shapes. In the depicted embodiment, the base ply 20 includes two disjointed portions—a first portion 26 and a second portion 28. When applied to the article 12 of FIG. 1, the first portion 26 is fixed to the first part 14 (e.g., lid) of the article 12 (e.g., container). Similarly, the second portion 28 is fixed to the second part 16 (e.g., sidewall) of the article 12 (e.g., container). The portions 26, 28 are separated by a gap 30 (e.g., an absence of material) in the base ply 20. In other words, the portions 26, 28 of the base ply 20 are disconnected from each other. The gap 30 may be formed (e.g., during manufacturing) by removing material from the base ply 20—by cutting when the base ply 20 is arranged on a carrier web, for example. Alternatively, the gap 30 may be formed by arranging the portions 26, 28 of the base ply 20 on the top ply 22 or on the article 12, for example.

Regardless of how the gap 30 is formed, the disconnected spatial relationship (e.g., the gap 30) between the first portion 26 and the second portion 28 of the base ply 20 exists at least when the base ply 20 is applied to the article 12 and/or when the top ply 22 is applied over the base ply 20. Particularly, the gap 30 between the first portion 26 and the second portion 28 is configured to be aligned with the boundary 18 between the first part 14 and the second part 16 of the article 12 such that the base ply 20 is attached to both the first part 14 and the second part 16 of the article 12, but not attached to (or attached over) the boundary 18. This construction (e.g., with the gap 30 located over the boundary 18) results in a single ply of the tamper evident label 10 (e.g., the top ply 22) being applied over the boundary 18 (e.g., edge) between the first part 14 (e.g., lid) and the second part 16 (e.g., sidewall) of the article 12 (e.g., container). In this way, the tamper evident label 10 may be more easily conformable along the boundary 18 of the article 12.

With continued reference to FIGS. 2A and 2B, the second portion 28 of the base ply 20 includes internal cuts 32. The internal cuts 32 extend fully through the thickness of the second portion 28 of the base ply 20. The internal cuts 32 are angled inwardly (towards a center of the second portion 28) from a top 34 (or first edge) towards a bottom 36 (or second edge) of the second portion 28 to form a roughly trapezoidal shape. As will be explained in greater detail below with respect to FIGS. 4A and 4B, the internal cuts 32 of the base ply 20 cooperate with aspects of the top ply 22 to help form the tab 24 of the tamper evident label 10.

Turning to FIG. 2A, the Figure shows the top surface 38 of the base ply 20. The top surface 38 of the base ply 20 faces and is adhered to an underside of the top ply 22. Turning now to FIG. 2B, the Figure shows adhesive 40 applied to the bottom surface 42 of the base ply 20. The bottom surface 42 faces and is adhered to a surface of the article 12. Alternatively, the adhesive 40 could be applied to a surface other than the bottom surface 42 of the base ply 20. For example, the adhesive 40 could be applied to the article 12 instead of or in addition to the bottom surface 42 of the base ply 20 in alternative embodiments. In the depicted embodiment, adhesive 40 is located on the bottom surface 42 of both the first portion 26 and second portion 28 of the base ply 20. However, the second portion 28 of the base ply 20 includes partially deadened adhesive 44 and/or deadened adhesive 46 around and extending beyond the roughly trapezoidal area formed by the internal cuts 32. The region of partially deadened adhesive 44 is located near the top 34 of the second portion 28, adjacent to the gap 30. The region of deadened adhesive 46 is located below (in the orientation of FIG. 2B) the region of partially deadened adhesive 44, near to the bottom 36 of the second portion 28.

With continued reference to FIG. 2B, the applied adhesive 40 may be deadened 46 or partially deadened 44 by applying a spot and/or pattern printed aqueous coating to at least a portion of the bottom surface 42 of the base ply 20. Such application may be of a water-base, solvent-base, or UV coating, for example. Alternatively, the partially deadened adhesive 44 may be printed adhesive patterned and/or voided to created patterned adhesion. As a further alternative, the adhesive 40 may be applied to the bottom surface 42 of the base ply 20 in all areas except the in area of deadened adhesive 46 to create the effect of deadened adhesive 46, but without the need to apply more adhesive 40 than is strictly necessary. In such a case, it would be unnecessary to deaden the applied adhesive 40.

Referring now to FIGS. 3A and 3B, a top ply 22 of the label 10 is shown. In an embodiment, the top ply 22 is made of paper, film, foil, or a similar material. In the depicted embodiment, the top ply 22 is generally rectangular in shape; however, it is to be understood that the top ply 22 may take on other shapes. The top ply 22 is dimensioned to fit over and configured to be attached to both portions 26, 28 of the base ply 20. At an end, the top ply 22 features a portion of a tab 24. The tab 24 is partially bordered on the left and right by tab cuts 48. The tab cuts 48 are small cuts on either side of the tab 24 that extend fully through the thickness of the top ply 22. As such, the tab cuts 48 pre-start the tears required to remove or peel the tab 24 from the tamper evident label 10 and allow for a user to more easily (and quickly) remove or peel the tab 24 from the tamper evident label 10. For example, the tab 24 is configured to be removed or peeled from the tamper evident label 10 by a user with a single gloved hand.

Above the tab 24, in a middle of the top ply 22, are perforations 50. The perforations 50 extend across the middle of the top ply 22 in a direction substantially perpendicular to the tab cuts 48. When the tamper evident label 10 is applied to the article 12, the perforations 50 roughly line up with the boundary 18 between the first part 14 and second part 16 of the article 12. The perforations 50 extend fully through the thickness of the top ply 22. Similar to the tab cuts 48, the perforations 50 pre-start the tears required to remove the tab 24 from the tamper evident label 10 and facilitate easier (and faster) removal of the tab 24 from the tamper evident label 10—by a single gloved hand, for example. Further, the perforations 50 serve as the uppermost bound of the tab 24 when the tab 24 is removed or peeled from the tamper evident label 10.

Turning to FIG. 3A, the Figure shows the top surface 52 of the top ply 22. The top surface 52 of the top ply 22 faces away from the article 12. Turning to FIG. 3B, the Figure shows adhesive 40 applied to the bottom surface 54 of the top ply 22. Unlike the base ply 20, there is no partially deadened adhesive 44 or deadened adhesive 46 on the bottom surface 54 of the top ply 22. The bottom surface 54 faces and is adhered to the top surface 38 of the base ply 20. Alternatively, the adhesive 40 could be applied to a different surface. For example, the adhesive 40 could be applied to the top surface 38 of the base ply 20 instead of or in addition to the bottom surface 54 of the top ply 22 in alternative embodiments.

Referring now to FIGS. 4A and 4B, a tamper evident label 10 is shown. The Figure shows the base ply 20 (of FIGS. 2A and 2B) and the top ply 22 (of FIGS. 3A and 3B) combining to form the tamper evident label 10. Prior to application to the article 12, the base ply 20 and the top ply 22 are laminated together and passed through external shape die cutting to arrive at the tamper evident label 10 construction as shown in FIGS. 4A and 4B.

As previously mentioned, the top ply 22 and the base ply 20 are dimensioned such that, in this embodiment, no part of the base ply 20 extends beyond the bounds of the top ply 22. In alternative embodiments, the base ply 20 may extend beyond the top ply 22 or the top ply 22 may extend beyond the base ply 20. Further, the top ply 22 is arranged on top of the base ply 20 such that the perforations 50 of the top ply 22 are arranged within the gap 30 of the base ply 20. The gap 30 and the perforations 50 are substantially aligned with the boundary 18 between the first part 14 and the second part 16 of the article 12. Thus, removing or peeling the tab 24 leaves no part of either the top ply 22 or the base ply 20 applied over the boundary 18 of the article 12 and provides a visual indicator (e.g., the absence of any ply) that the tamper evident label 10 has been tampered with.

Further, FIG. 4B shows the internal cuts 32 of the base ply 20 substantially lined up with the tab cuts 48 of the top ply 22 to form the bounds of the tab 24. The substantial alignment of the internal cuts 32 and the tab cuts 48 facilitates the removal or peeling of the tab 24.

Figure 5:
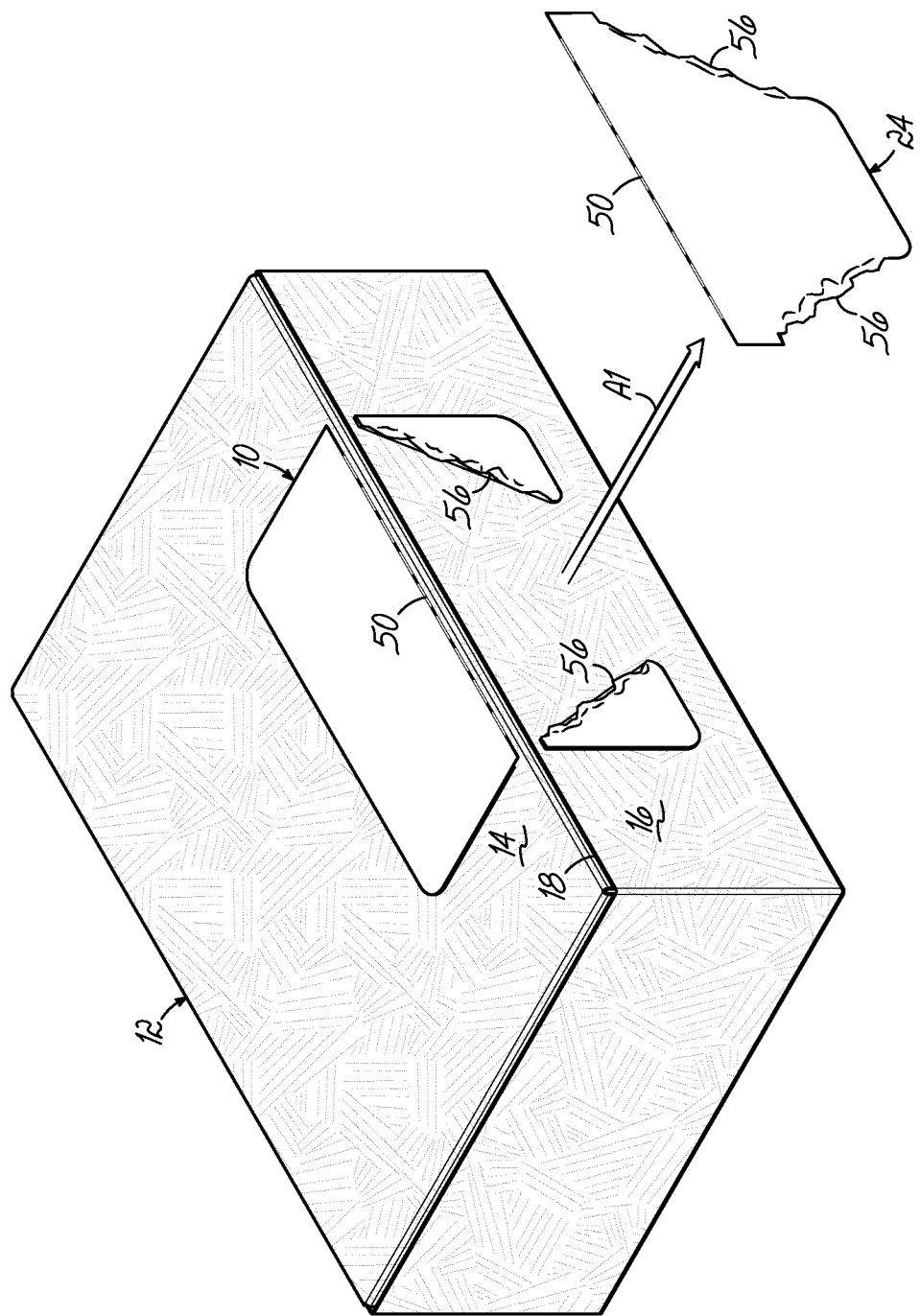
FIG. 5 is a perspective view of the tamper evident label of FIG. 1, showing a tab removed from the tamper evident label.

Turning to FIG. 5, the Figure shows the removal of the tab 24 from the tamper evident label 10 and the article 12. As illustrated by arrow A1, in order to access the contents of the article 12 (e.g., a container) a user removes the tab 24 by pulling the tab 24 from the tamper evident label 10. Removing the tab 24 creates fractures 56 in the tamper evident label 10 in the general area of the internal cuts 32 thereby facilitating removal of the tab 24 from the label 10. Further, the fractures 56 provide visual evidence of any tampering with the label 10. In other words, removing the tab 24 reveals or creates tamper evidence (e.g., fractures 56) as the tab 24 is removed. Alternatively, a user may peel the tab 24, leaving the tab 24 attached to only the first part 14 (e.g., lid) of the article 12 instead of fully removing the tab 24 from the label 10.

Further, as shown, removing the tab 24 requires removing portions of both the top ply 22 and the base ply 20. Thus, no ply 20, 22 is left on the article 12 in the region of the tab 24 (e.g., the area between the internal cuts 32 of the base ply 20 and the area between the tab cuts 48 of the top ply 22) after the tab 24 is removed. Because of this feature, removing the tab 24 results in a visual indicator on the article 12 that the tamper evident label 10 has been tampered with. The visual indicators are, at least, the remainder of the tamper evident label 10 surrounding the region that the tab 24 previously occupied, the absence of any ply 20, 22 in the region that the tab 24 previously occupied, and the presence of fractures 56 on the edges of tamper evident label 10 remaining on the article 12.

With continued reference to FIG. 5, due to the partially deadened adhesive 44 and the deadened adhesive 46 on the bottom surface 42 of the base ply 20, the tab 24 cannot be reapplied to the article 12 once initially removed. In other words, the tamper evident label 10 cannot be resealed after the tab 24 is removed or peeled from the article 12. In an alternative embodiment, the tab 24 may be lifted but not completely separated from the article 12 (e.g., peeled). In such a situation, the tamper evident label 10 would still provide visual evidence that the tamper evident label 10 was tampered with, but without requiring the tab 24 to be completely removed from the article 12.

Referring now to FIGS. 6A and 6B, an alternative embodiment of the tamper evident label 10 is shown. The alternative embodiment shown in FIGS. 6A and 6B is similar to the embodiment shown in FIGS. 1 through 5. However, the alternative embodiment features an inlay element 58—such as an RFID or NFC smart tag or similar—within the tamper evident label 10. Further, the alternative embodiment illustrates that the proportions and size of the tamper evident label 10 can vary. For example, the portion of the tamper evident label 10 configured to the be affixed to the first part 14 (e.g., lid) of the article 12 may be larger (e.g., longer) than the portion of the tamper evident label 10 configured to be affixed to the second part 16 (e.g., sidewall) of the article 12. As a result, the tab 24 may be smaller (e.g., shorter).

Turning to FIG. 7, the Figure shows the alternative embodiment of the tamper evident label 10 with the tab 24 removed (similar to FIG. 5). Removing (or peeling) the tab 24 from the alternative embodiment of the tamper evident label 10 separates (e.g., severs or fractures) a portion of the inlay element 58 from the remainder of the inlay element 58. In severing or fracturing a portion of the inlay element 58, the inlay element 58 no longer functions as intended. For example, in the case of an RFID or NFC smart tag, severing or fracturing a portion of the inlay element 58 prevents the RFID or NFC smart tag from functioning thereby providing a further indicator to a user that the tamper evident label 10 has been tampered with.

While the present invention has been illustrated by the description of various embodiments and while these embodiments have been described in some detail, it is not the intention of the Applicant to restrict or in any way limit the scope of the invention to such detail. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A tamper evident label comprising:
    a base ply of pressure-sensitive material, the base ply including a first portion and a separate second portion, the second portion of the base ply including internal cuts extending from a first edge of the second portion towards a second edge of the second portion, a deadened adhesive located on the second portion in a region substantially between the internal cuts; and
    a top ply of pressure-sensitive material, the top ply including a tab portion, the tab portion defined by tab cuts located on opposing sides of the tab portion, the tab cuts extending towards a center of the top ply,
    wherein the base ply and the top ply are laminated together to form the tamper evident label, and
    wherein the tab portion of the top ply and the region substantially between the internal cuts of the base ply are configured to be removed from the tamper evident label to create visual evidence of tampering.

2. The tamper evident label of claim 1, wherein the internal cuts of the base ply and the tab cuts of the top ply are substantially aligned.

3. The tamper evident label of claim 1, wherein the internal cuts extend towards a center of the second portion.

4. The tamper evident label of claim 1, wherein the top ply includes perforations extending substantially across a width of the top ply.

5. The tamper evident label of claim 1, wherein the deadened adhesive extends beyond the region substantially between the internal cuts.

6. The tamper evident label of claim 1, wherein the deadened adhesive includes a partially deadened adhesive, the partially deadened adhesive located proximal to the first edge of the second portion of the base ply.

7. The tamper evident label of claim 1, wherein the label includes an inlay element and wherein removing the tab portion from the tamper evident label tab fractures the inlay element thereby disabling its use.

8. The tamper evident label of claim 7, wherein the inlay element is selected from the group consisting of an RFID inlay and an NFC inlay.

9. The tamper evident label of claim 1, wherein the base ply and the top ply are made of a material selected from the group consisting of paper and film.

10. A method of constructing a tamper evident label, the method comprising:
- providing a base ply of pressure-sensitive material, the base ply including a first portion and a second portion, the second portion of the base ply including internal cuts, an adhesive located on the second portion in a region substantially between the internal cuts;
- providing a top ply of pressure-sensitive material, the top ply including a tab portion, the tab portion defined by tab cuts located on opposing sides of the tab portion; and
- laminating the base ply and the top ply together to form the tamper evident label such that the internal cuts of the base ply and the tab cuts of the top ply are substantially aligned.

11. The method of constructing a tamper evident label of claim 10, the method further comprising deadening the adhesive by applying a spot and/or pattern printed aqueous coating to the adhesive.

12. The method of constructing a tamper evident label of claim 11, wherein the step of deadening includes applying the spot and/or pattern printed aqueous coating by a print system selected from the group consisting of water-base, solvent-base, and UV coating.

13. The method of constructing a tamper evident label of claim 10, wherein the adhesive is printed on the second portion in a pattern.

14. The method of constructing a tamper evident label of claim 10, wherein the adhesive is voided on the second portion in a pattern.

15. The method of constructing a tamper evident label of claim 10, the method further comprising inserting an inlay element between the base ply and the top ply.

16. The method of constructing a tamper evident label of claim 15, wherein the inlay element is selected from the group consisting of an RFID inlay and an NFC inlay.

17. A method of using a tamper evident label, the method comprising:
- providing the tamper evident label, the tamper evident label comprising:
  - a base ply of pressure-sensitive material, the base ply including a first portion and a second portion, the second portion of the base ply including internal cuts, a deadened adhesive located on the second portion in a region substantially between the internal cuts; and
  - a top ply of pressure-sensitive material, the top ply including a tab portion, the tab portion defined by tab cuts located on opposing sides of the tab portion,
  - wherein the base ply and the top ply are laminated together to form the tamper evident label; and
- applying the tamper evident label to an article over a boundary of the article.

18. The method of using a tamper evident label of claim 17, the method further comprising removing the tab portion of the top ply and the region substantially between the plurality of internal cuts of the base ply from the tamper evident label to create visual evidence of tampering.

19. The method of using a tamper evident label of claim 18, wherein the tamper evident label includes an inlay element and wherein the step of removing further includes fracturing the inlay element thereby disabling its use.

20. The method of using a tamper evident label of claim 17, wherein the article is a container, the container including a lid and a sidewall, the boundary between the lid and the sidewall.

* * * * *